United States Patent [19]

Takahashi

[11] Patent Number: 5,257,334
[45] Date of Patent: Oct. 26, 1993

[54] RIBBON TYPE OPTICAL FIBER CONNECTOR

[75] Inventor: Mitsuo Takahashi, Matsudo, Japan

[73] Assignee: Seikoh Giken Co., Ltd., Matsudo, Japan

[21] Appl. No.: 949,216

[22] Filed: Sep. 23, 1992

[30] Foreign Application Priority Data

Sep. 24, 1991 [JP] Japan ............................. 3-272124

[51] Int. Cl.$^5$ ................................................ G02B 6/36
[52] U.S. Cl. .......................................... 385/65; 385/63; 385/83
[58] Field of Search ................ 385/65, 80, 83, 66, 385/64, 63

[56] References Cited

U.S. PATENT DOCUMENTS

| | | | |
|---|---|---|---|
| 4,343,532 | 8/1982 | Palmer | 385/36 |
| 4,461,536 | 7/1984 | Shaw et al. | 385/12 |
| 4,493,528 | 1/1985 | Shaw et al. | 385/30 |
| 4,556,279 | 12/1985 | Shaw et al. | 385/30 |
| 4,737,007 | 4/1988 | Alferness et al. | 385/30 |
| 4,818,059 | 4/1989 | Kakii et al. | 385/65 |
| 4,834,481 | 5/1989 | Lawson et al. | 385/44 |
| 4,836,638 | 6/1989 | Finzel | 385/65 X |
| 4,909,584 | 3/1990 | Imoto et al. | 385/15 |
| 4,953,935 | 9/1990 | Suchoski, Jr. et al. | 385/46 |
| 4,989,946 | 2/1991 | Williams et al. | 385/16 |
| 4,991,922 | 2/1991 | Dahlgren | 385/50 |
| 5,000,530 | 3/1991 | Takahashi | 385/15 |
| 5,015,058 | 5/1991 | Thorncraft et al. | 385/28 |
| 5,016,972 | 5/1991 | Schlaak | 385/65 |
| 5,024,505 | 6/1991 | Junji et al. | 385/97 |
| 5,035,482 | 7/1991 | ten Berge et al. | 385/16 |
| 5,066,094 | 11/1991 | Takahashi | 385/73 |
| 5,155,781 | 10/1992 | Doss et al. | 385/98 X |

FOREIGN PATENT DOCUMENTS 0425426  5/1991  European Pat. Off. .
WO91/11703  8/1991  PCT Int'l Appl. .

OTHER PUBLICATIONS

Yamamoto et al., "A Large-Tolerant Single-Mode Optical Fiber Coupler . . . ", *Proc.* of IEEE, Jun. 1976, pp. 1013-1014.

Kobayashi et al., "Optical Demultiplexer Using Coupling . . . ," *Applied Optics*, vol. 17, No. 20, Oct. 1978, pp. 3253-3258.

*Primary Examiner*—Brian Healy
*Assistant Examiner*—Phan Thi Heartney
*Attorney, Agent, or Firm*—Spencer, Frank & Schneider

[57] ABSTRACT

On an optical connector plug main body 3 whose transverse section is a trapezoid, a groove 6 of rectangular transverse section is provided, at a bottom of which a plurality of alignment V grooves 7 are formed. In a plate member 9 of rectangular transverse section has a receiving groove 10 of also rectangular transverse section, the groove 10 being connected with the bottom of the plate member 9. An alignment sleeve 12 has an alignment groove 14 of wedge head shape. The plate member 9 is engaged with the groove 6 of the connector plug main body 3, and protrusions 11 of the plate member 9 is ultrasonic bonded into recesses 8 provided in the connector plug main body 3. A ribbon type optical fiber to which an adhesive is applied is inserted from the groove 6 to complete the connector plug. Thus assembled connector plugs are inserted in the state whose ends are faced with each other into the groove 14 of the alignment sleeve 12 to make the connection of the ribbon type optical fiber.

3 Claims, 6 Drawing Sheets

FIG. I(a)
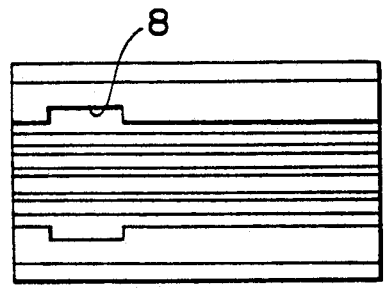
FIG. I(b)
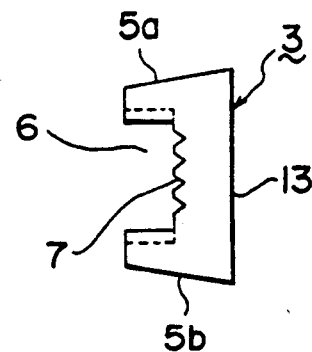
FIG. I(c)
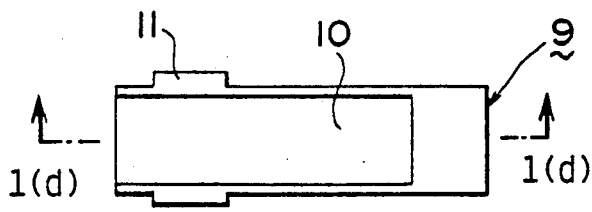
FIG. I(d)
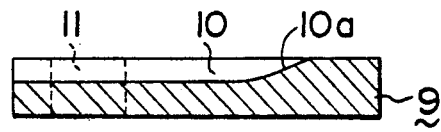
FIG. I(e)
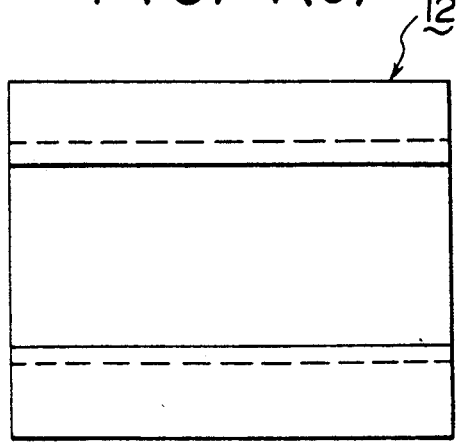
FIG. I(f)
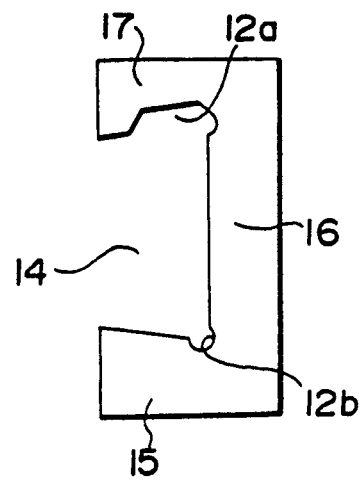

RIBBON TYPE OPTICAL FIBER CONNECTOR

BACKGROUND OF THE INVENTION

The present invention relates to a connector for ribbon type optical fiber used for an optical fiber communication circuit system, whose cover or sheath is made of plastic material. More particularly, it relates to a connector for ribbon type optical fiber which can avoid deterioration of metal mold for molding a connector, and as the result it can reduce deterioration of aligning precision of an optical fiber caused by repeated attachment and detachment of the connector. The connector thus can much reduce an undesirable reflection return loss at joint locations where a number of optical fiber elements each having core and clad are jointed with each other.

In order to form an optical path in the optical fiber communication circuit system, optical fiber connectors are important elements.

FIGS. 7(a) and 7(b) show an example of a conventional connector for a ribbon type optical fiber, FIG. 7(b) being its side view and FIG. 7(a) is a plan view in section cut along the line C—C of FIG. 7(b).

At the central portion of a rectangular member 21 are provided a plurality of extremely small holes 23 for inserting optical fiber elements 22 in line and a hole 25 of a rectangular cross section into which cover portion 24 of the ribbon type optical fiber is inserted. At both sides of the line of the extremely small holes 23, there are provided alignment pin holes 26 through which alignment pins 27 are inserted.

The extremely small holes 23, the hole 25 of rectangular cross section and the alignment pin holes 26 are molded according to the plastic molding. This connector is easily assembled in that assembling is easily carried out by only inserting and bonding ribbon type optical fiber.

Core pins of a mold used for forming the extremely small holes 23 are very small in size, the order of 0.1254 mm±0.005 mm in diameter. It is difficult to form the precise core pin. It has been usual to use the plastic material in which 50% or more, in weight, of glass fiber filament fillers are mixed for improving the strength and stability of size of molded products.

When the above mentioned material is used, core pins are easily scrubbed by molded holes. When injecting the material, high pressured plastic material is applied and core pins are easily worn out during the injecting operation by the glass fillers included in the material. For this reason the mold cannot fit for repeated use. broken and for this reason cannot be used for repeated use. Furthermore, in assembling the molded parts and the fiber elements, it is required to have a very small clearance between the optical fiber elements and the extremely small holes 23. It results in non-agreement between the fixed position of an optical fiber and the center position of a hole, which generates eccentric difference of 1-2 μm. Thus loss of connection or insertion loss of connector is liable to become large.

In order to overcome the above-mentioned drawbacks, there have been proposed connectors of the type in which V-shaped grooves are provided for optical fiber elements.

FIGS. 8(a), 8(b) and 8(c) show an example of such a proposed connector. FIG. 8(b) shows a side and sectional view of the alignment V-shaped groove type connector and FIG. 8(a) is a D—D section of FIG. 8(b). FIG. 8(c) is an enlarged view of a V-shaped groove. In this example, a pair of members 30, 31 are lapped together and made integral, in both of which are provided four V-shaped grooves 28 for taking out a ribbon type optical fiber of four optical fiber elements 22 and two alignment grooves 29.

A metal mold for forming this connector has respective V-shaped groove forming portions at respective inner walls and it does not require any core pins as used in the prior art system as shown in FIGS. 7(a) and 7(b). Therefore, the die and the V-shaped groove forming portions may be designed without any fear of wearing with the molded body and the connector is free from wearing and since it does not receive any influences of wearing of the mold, it is good in stability of size.

In assembling, the optical fiber elements 22 are adhered and fixed by putting them between the member 30, 31 and therefore there is no problem of the alignment error by the clearance generated in the already explained prior art hole type connector.

However, the assembling efficiency of this alignment V-shaped groove type connector is inferior to the hole type connector, in that attachment of the optical fibers and assembly as well as integration of plural parts has to be carried out simultaneously, and therefore many steps of operations and the skill are required.

As mentioned above, alignment of a pair of connectors of the ribbon type optical fiber has been made mainly according to the alignment pin type connector shown in FIGS. 7(a) and 7(b) and the alignment V-shaped groove type connector as shown in FIGS. 8(a), 8(b) and 8(c).

The alignment pin type connector uses the material of connector of plastic including glass and so the alignment holes and alignment pins of the die are easily abraded by repeating the injection of resin material, taking off the product therefrom. Thus the precision of alignment is liable to be deteriorated On the other hand, the alignment V-shaped groove type connector has similar drawbacks, though little, that after the repeat of attaching and detaching, the alignment V-groove portion and protrusions of the V-shaped grooves are worn out.

Since both types have no particular means for recovering or amending the abrasion in the systems, there has been problems for their durability for attaching and detaching.

An object of the present invention is to solve the above problems and to provide a ribbon type optical fiber connector which is excellent in assembling operation, can avoid the generation of an error in mounting position of the optical fiber and which can avoid any abrasion of grooves due to the repeated attaching and detaching operations.

SUMMARY OF THE INVENTION

A ribbon type optical fiber connector according to the present invention comprises: an optical connector plug main body whose transverse section is a trapezoid having a groove of a rectangular transverse section on an upper face of the main body in a longitudinal direction, and in a longitudinal direction of a bottom of the groove having V-shaped grooves for aligning a plurality of optical fiber elements, a plate member of a rectangular transverse section having a groove of a rectangular transverse section in a longitudinal direction of a bottom of the plate member into which a cover portion of the ribbon type optical fiber is inserted, the rectangular groove being connected with the bottom of the member at a slope thereof, and an alignment sleeve, of rectangular transverse section, having a groove provided in a longitudinal direction with respect to the upper face of the alignment sleeve and into which the optical connector plug main body is pressedly put while contacting two inclined faces of the optical connector plug main body, one of the two inclined faces and the bottom face being made reference faces, the plate member being engaged at its portion in the rectangular groove of the optical connector plug main body and bonded therewith, ends of the ribbon type optical fibers are inserted from one end of the rectangular groove of the plate member and the fibers of the ribbon type optical fiber being guided into the V-shaped grooves, thus assembling into an integral body, whereby two integral bodies thus assembled are engaged while being faced with each other at the respective end surfaces in the groove of the alignment sleeve.

The end face of the assembled connector plug has inclination of more than eight degrees in the aligning direction of the optical fiber with respect to a right angle of an optical axis of the optical fiber, a transverse section thereof is formed with an arc and a central point of the arc is on an axis which is inclined more than eight degrees with respect to the optical axis of the optical fiber.

A plurality of the alignment sleeves separated by slits are provided for a single member.

BRIEF DESCRIPTION OF THE DRAWINGS

FIGS. 1(a), 1(b), 1(c), 1(d), 1(e) and 1(f) show parts of a ribbon type optical fiber connector according to the present invention. FIG. 1(a) is a plan view of a connector plug main body and FIG. 1(b) shows its side view. FIG. 1(c) is a plan view of the plate member and FIG. 1(d) is an A—A section of FIG. 1(c). FIGS. 1(e) and 1(f) are a plan view of an alignment sleeve and a side view, respectively.

FIG. 2(a) is a plan view thereof, FIG. 2(b) a B—B section of FIG. 2(a), and FIG. 2(c) a side view.

FIG. 4(a) shows this state and FIG. 4(b) shows a C—C section of FIG. 4(a).

FIG. 7(a) is a plan view in section cut along the line C—C of FIG. 7(b).

FIG. 8(b) shows a side and sectional view of the alignment V-shaped groove type and FIG. 8(a) is a D—D section of FIG. 8(b). FIG. 8(c) is an enlarged view of a V-shaped groove.

PREFERRED EMBODIMENTS

Figure 2A:
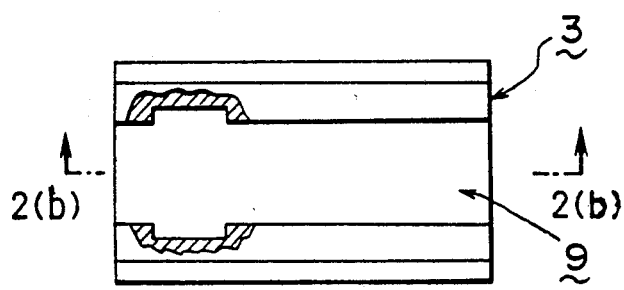
FIGS. 2(a), 2(b) and 2(c) show an assembled state of the main body and the plate member.

The present invention will be explained in further detail with reference to the attached drawings. In the drawings, FIGS. 1(a), 1(b), 1(c), 1(d), 1(e), and 1(f) show parts of a ribbon type optical fiber connector according to the present invention.

FIG. 1(a) is a plan view of a connector plug main body 3 and FIG. 1(b) its side view. The main body 3 has a transverse section of a trapezoid (as seen in FIG. 1(b)) and on its upper face a groove 6 of rectangular shape is provided.

Figure 3A:
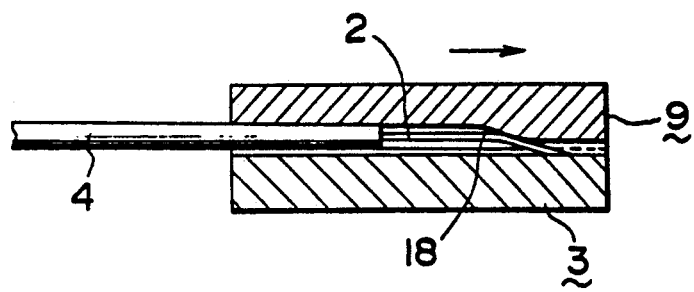
FIGS. 3(a), 3(b) and 3(c) are sections for explaining the steps of mounting the ribbon type optical fiber into the connector plug.

At the bottom of the groove 6, there are provided a plurality of alignment V-shaped grooves 7 for a ribbon type optical fibers 2 (FIG. 3(a)).

Two recesses 8 are further provided with which a part of plate member 9 is bonded by the ultrasonic bonding.

FIG. 1(c) is a plan view of the plate member 9 and FIG. (d) is an A—A section of FIG. 1(c). The plate member 9 has a rectangular transverse section on one side of which a receiving groove 10 receives a cover 4 (FIG. 3(a)) of the ribbon type optical fiber. The groove 10 is formed in the intermediate position of the one side face and with this structure the bottom face and an upper surface of the groove 10 connect at an inclination face 10a.

At both side faces of the plate member 9 are provided protrusions 11 to be press-bonded to the recesses 8 of the connector plug main body 3.

FIGS. 1(e) and 1(f) are a plan view of an alignment sleeve and a side view, respectively. The alignment sleeve 12 has a rectangular transverse section. On one face thereof a wedge head groove 14 is provided, into which the assembled connector plugs are inserted.

By attaching the connector plug main body, inclining faces 5a, 5b and outer bottom face 13 contact with side faces and bottom face of the wedge head groove 14 of the alignment sleeve 12. Alignment surfaces of the connector plug main body 3 comprise thus the inclination face 5b and the bottom face 13.

The stiffness of the alignment sleeve 12 increases by using thick side wall 15 and thick bottom wall 16 both of which constitute alignment or reference surfaces thereof, while another side wall 17 is made with thinner wall. The inclination degree of an inner side of the side wall 17 is made somewhat larger than the face 5a of the connector plug main body 3, so that the upper portion of the inclination face 5a may be pressed by a stress of thinner wall 17.

Figure 2B:
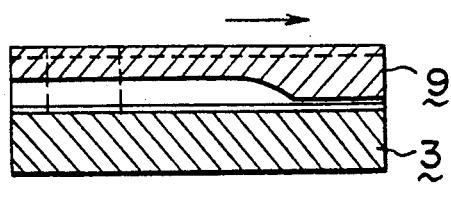
Figure 2C:
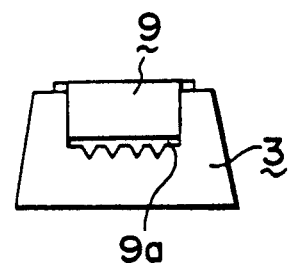

FIGS. 2(a), 2(b) and 2(c) show an assembled state of the main body 3 and the plate member 9. FIG. 2(a) is a plan view thereof, FIG. 2(b) a B—B section of FIG. 2(a), and FIG. 2(c) a side view.

The ultrasonic bonding is made at protrusions 11,11 and recesses 8,8 and the leading end of the plate member 9 is in the state of just overlapped. Therefore, the plate member 9 may be opened at the leading end portion using a razor blade, or other means. Other portions of the plate member are bonded integrally with the connector plug main body 3 when the optical fiber elements are inserted thereinto by an adhesive applied to the ribbon type optical fiber and the cover thereof.

Figure 3B:
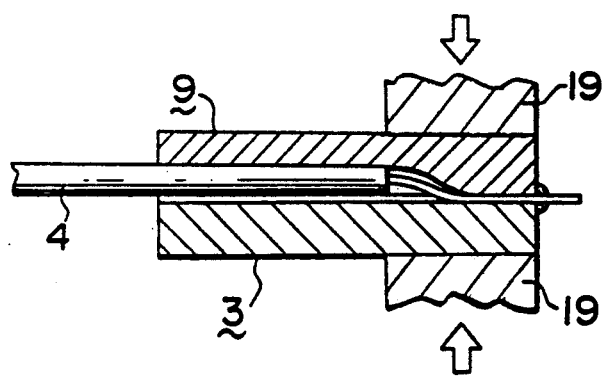
Figure 3C:
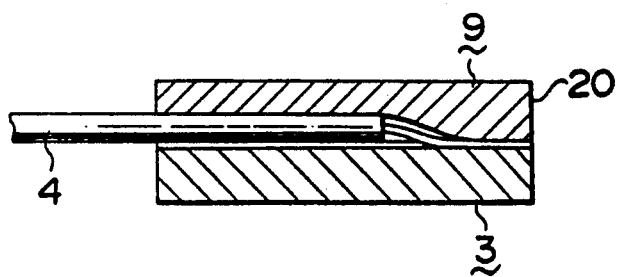

FIGS. 3(a), 3(b) and 3(c) are sections for explaining the steps of mounting the ribbon type optical fiber into the connector plug onto which the plate member 9 is bonded as shown in FIGS. 2(a), 2(b) and 2(c). FIG. 3(a) shows the state where the cover 4 and optical fiber elements 2 of the ribbon type optical fiber are bonded with each other and the optical fiber is inserted into the intermediate of the connector plug 3.

Ends of the optical fiber are guided along the inclined face 10a (see FIG. 1(b)) to bend into an arc and by the stress they are pressed and inserted tightly to the alignment V-shaped grooves 7 (see FIG. 1(b)).

FIG. 3(b) shows the state where the insertion is finished and the optical fiber is cured by pressing with a jig 19. When the optical fiber elements 2 are press bonded to the alignment V-shaped grooves 7, the plate member 9 is bonded with the main body 3 together integrally.

FIG. 3(c) shows the state where the end face 20 of the connector plug main body 3 is scrubbed and polished into a completed form.

Figure 4A:
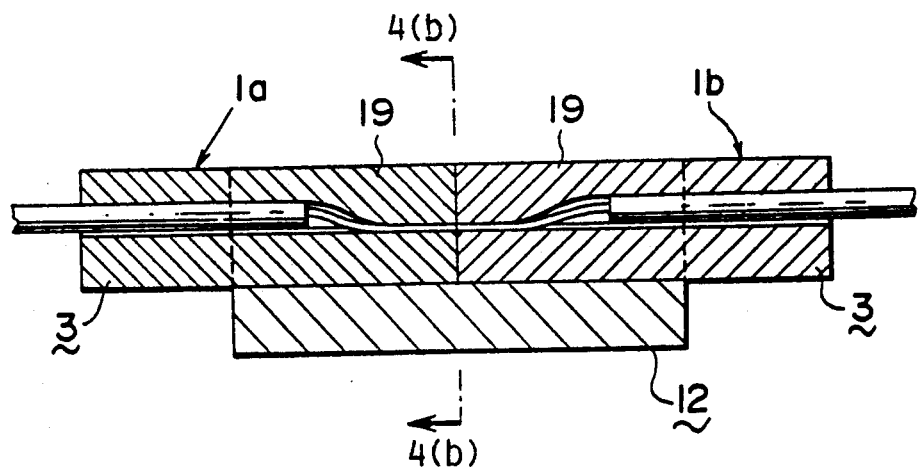
FIGS. 4(a) and 4(b) show the state where a pair of the completed connector plug are inserted into the alignment sleeve.
Figure 4B:
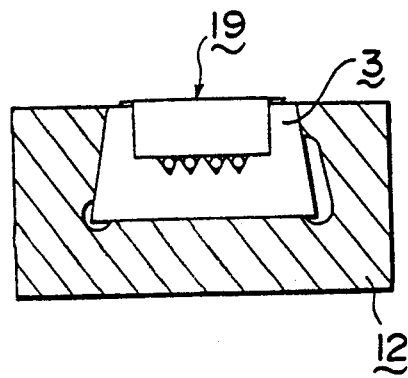

FIGS. 4(a) and 4(b) show the state where a pair of the completed connector plugs la and lb are inserted into the alignment sleeve 12 so that the ribbon type optical fibers are connected. FIG. 4(a) shows this state and FIG. 4(b) shows a C—C section of FIG. 4(a).

In order to increase the tightness of the connected end faces, a compression spring (not shown) may be provided to press the main bodies 3 of the respective connector plugs.

Figure 5:
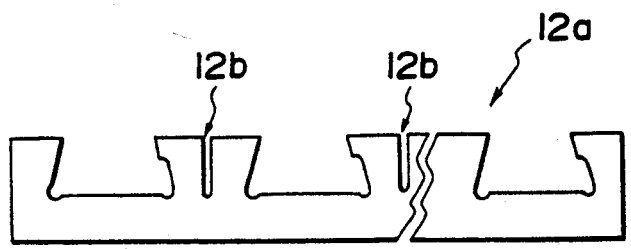
FIG. 5 is a side view of another embodiment of the alignment sleeve.

FIG. 5 is a side view of another embodiment of the alignment sleeve 12a. Slits 12b, 12b are provided between the wedge head portions 14,14,14 and independent plug holding forces are given to each aligning portions of the alignment sleeve 12a.

By using a number of alignment portions in a single member, many ribbon type optical fiber plugs may be connected.

Figure 6A:
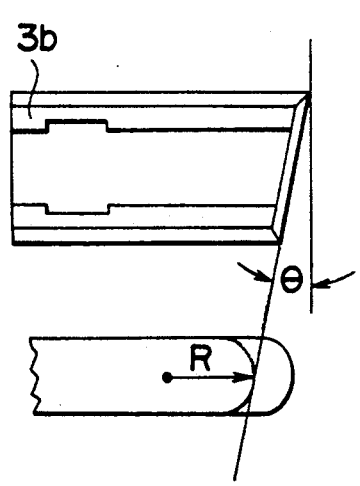
FIGS. 6(a) and 6(b) show modified examples of shape of the end faces of the connector plug.
Figure 6B:
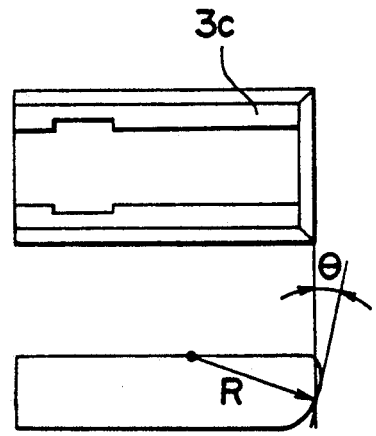
Figure 7A:
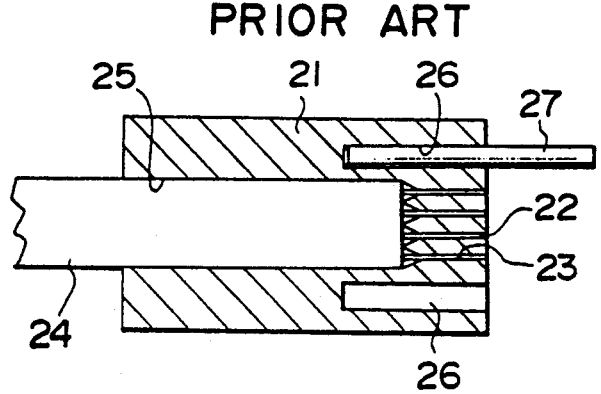
FIGS. 7(a) and 7(b) show an example of a conventional connector for a ribbon type optical fiber, FIG. 7(b) being its side view
Figure 7B:
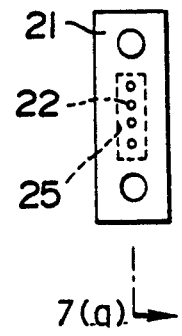
Figure 8A:
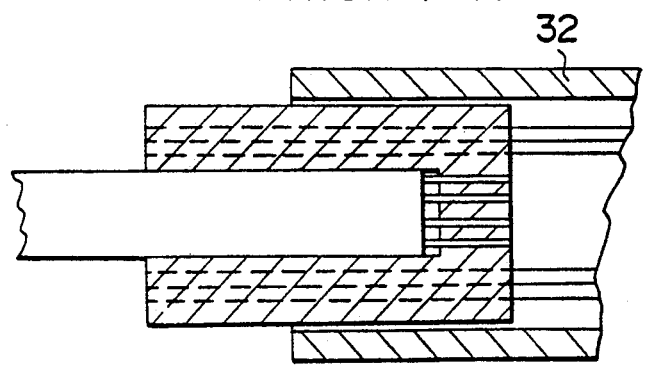
FIGS. 8(a), 8(b) and 8(c) show an example of such a proposed connector.
Figure 8B:
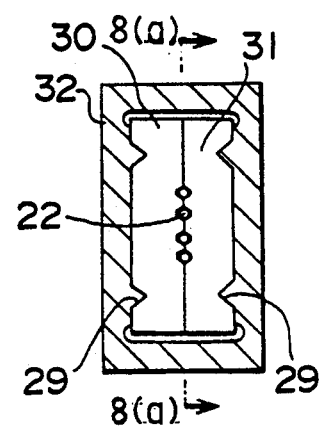
Figure 8C:
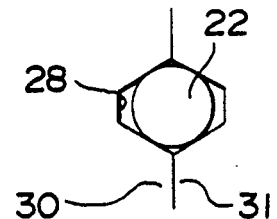

FIGS. 6(a) and 6(b) show modified examples of shape of the end faces of the connector plug assembled with the plate member 9 and the ribbon type optical fiber, not shown. FIG. 6(a) shows a connector plug 3b whose end face has an inclination angle $\theta$ larger than eight degrees with respect to a plane perpendicular to the optical axis of the optical fiber, and the section surface is made an arc having a radius R.

FIG. 6(b) shows the connector plug 3c having an arcuated end surface, whose axle of the arc is made to incline more than eight degrees laterally with respect to the optical axis of the optical fiber.

Thus the reflection loss of light at the end surface can be reduced.

As fully mentioned above, the ribbon type optical fiber connector according to the present invention is provided with an optical connector plug main body whose transverse section is a trapezoid having a groove of a rectangular transverse section on an upper face of the main body in a longitudinal direction, and in a longitudinal direction of a bottom of the groove having V-shaped grooves for aligning a plurality of optical fiber elements and a plate member of a rectangular transverse section having a groove of a rectangular transverse section in a longitudinal direction of a bottom of the plate member into which a cover portion of the ribbon type optical fiber is inserted. The plate member is engaged with the rectangular groove of the optical connector plug main body and a part of the plate member is press bonded at the protrusions 11,11 and recesses 8,8 by the ultrasonic bonding or other method. On the other hand, the leading end of the plate member 9 is in the state of just overlapped. Therefore, the plate member 9 may be opened at the leading end portion using a razor blade, or other means. With this structure, optical fiber elements of different diameters can be fixed by pressure to the V-shaped groove by the plate member.

Therefore, the assembling efficiency is much improved compared with the prior art V-shaped groove type connector in which attachment of the optical fibers and assembling as well as integration of plural parts has to be carried out easily.

When the ribbon type optical fiber is inserted into the intermediate portion between the connector plug main body and the plate member, the optical fiber elements are pressed and inserted tightly and guided to the alignment V-shaped grooves 7.

The connector plug main body of the trapezoid transverse section is used, and the side faces are inclined, while the alignment sleeve has an alignment groove into which the connector plug main body may be press inserted, making one of the two inclined faces and a bottom face of the connector plug main body as reference faces. The inner faces of the main body and the groove of the alignment sleeve may be worn by abrasion but the durability of attaching and detaching has been much improved.

The connecting end faces of the connector plug main body may be inclined more than eight degrees with respect to the plane perpendicular to the optical axis of the optical fiber and a transverse section thereof may be formed with an arc. Thus the reflection return loss of connection could much be reduced.

A plurality of the alignment sleeves separated by slits may be provided for a single member.

According to the present invention, the drawbacks of the prior art hole type connector as described above: easy abrasion of molding die, deterioration in precision of alignment, and others could be eliminated. The problems of durability due to abrasion of core pins and alignment groove caused by the repeated attachment and detachment, which are seen in both of the prior art alignment pin type connector and alignment V-shaped groove type connector could be overcome.

What is claimed is:

1. A ribbon type optical fiber connector comprising:
   an optical connector plug main body whose transverse section is a trapezoid having a groove of a rectangular transverse section on an upper face of the of the main body in a longitudinal direction, and in a longitudinal direction of a bottom of the groove having V-shaped grooves for aligning a plurality of optical fiber elements,
   a plate member of a rectangular transverse section having a groove of a rectangular transverse section in a longitudinal direction of a bottom of the plate member into which a cover portion of the ribbon type optical fiber is inserted, the rectangular groove being connected with the bottom of the member at a slope thereof, and
   an alignment sleeve, of rectangular transverse section, having a groove provided in a longitudinal direction with respect to the upper face of the alignment sleeve and into which the optical connector plug main body is pressedly put while contacting two inclined faces of the optical connector plug main body, one of the two inclined faces and the bottom face being made reference faces,
   the plate member being engaged at its portion in the rectangular groove of the optical connector plug main body and bonded therewith, ends of the ribbon type optical fibers are inserted from one end of the rectangular groove of the plate member and the fibers of the ribbon type optical fiber being guided into the V-shaped grooves, thus assembling into an integral body, whereby two integral bodies thus assembled are engaged while being faced with each other at the respective end surfaces in the groove of the alignment sleeve.

2. A ribbon type optical fiber connector according to claim (1), wherein the end face of the assembled connector plug has inclination of more than eight degrees in the aligning direction of the optical fiber with respect to a right angle of an optical axis of the optical fiber, a transverse section thereof is formed with an arc and a central point of the arc is on an axis which is inclined more than eight degrees with respect to the optical axis of the optical fiber.

3. A ribbon type optical fiber connector according to claim (1), wherein a plurality of the alignment sleeves separated by slits are provided for a single member.

* * * * *